(12) United States Patent
Lacki et al.

(10) Patent No.: US 12,485,530 B2
(45) Date of Patent: Dec. 2, 2025

(54) FIVE-BAR FOLDING MECHANISM AND METHOD WITH QUICK RELEASE FUNCTIONALITY

(71) Applicant: Haply Robotics Inc., Montreal (CA)

(72) Inventors: Maciej Bartosz Lacki, Montreal (CA); Felix Desourdy, Montreal (CA); Antoine Weill-Duflos, Montreal (CA)

(73) Assignee: Haply Robotics Inc., Montreal (CA)

( * ) Notice: Subject to any disclaimer, the term of this patent is extended or adjusted under 35 U.S.C. 154(b) by 0 days.

(21) Appl. No.: 19/106,813

(22) PCT Filed: Jul. 28, 2023

(86) PCT No.: PCT/CA2023/051017
§ 371 (c)(1),
(2) Date: Feb. 26, 2025

(87) PCT Pub. No.: WO2024/020694
PCT Pub. Date: Feb. 1, 2024

(65) Prior Publication Data
US 2025/0229415 A1    Jul. 17, 2025

Related U.S. Application Data

(60) Provisional application No. 63/392,945, filed on Jul. 28, 2022.

(51) Int. Cl.
*B25J 9/10* (2006.01)
*F16H 21/10* (2006.01)

(52) U.S. Cl.
CPC ............. *B25J 9/106* (2013.01); *F16H 21/10* (2013.01)

(58) Field of Classification Search
CPC ................... B25J 9/106; F16H 21/10
See application file for complete search history.

(56) References Cited

U.S. PATENT DOCUMENTS

| 4,218,173 A * | 8/1980 | Coindet | G05G 21/00 |
| | | | 414/730 |
| 6,056,504 A * | 5/2000 | Hudgens | B25J 9/107 |
| | | | 414/744.6 |
| 2001/0012483 A1* | 8/2001 | Kono | B25J 9/107 |
| | | | 414/744.5 |

FOREIGN PATENT DOCUMENTS

| AT | 204601 B | 8/1959 |
| CN | 109223432 A | 1/2019 |
| WO | 2019039710 A1 | 2/2019 |

OTHER PUBLICATIONS

International Searching Authority—Canadian Intellectual Property Office; International Search Report filed in corresponding International Application No. PCT/CA2023/051017, dated Sep. 11, 2023; 3 pages.

(Continued)

*Primary Examiner* — Terence Boes
(74) *Attorney, Agent, or Firm* — Black McCuskey

(57) ABSTRACT

Described are various embodiments of a five-bar folding mechanism and method with quick release functionality. In one embodiment, the mechanism is used with a five-bar linkage comprising a first arm and a second arm rotatively coupled to a same joint, the first arm and second arm defining an angle therebetween. The mechanism comprises an energy storage element coupled to the first arm and configured to be engaged by the second arm upon the angle being smaller than a designated angle, and to store mechanical energy upon said first arm and said second arm being brought further into co-alignment. The energy storage element is further configured to release the stored mechanical energy upon the five-bar linkage being unfolded, pushing the first arm and second arm apart.

10 Claims, 5 Drawing Sheets

(56) References Cited

OTHER PUBLICATIONS

International Searching Authority—Candadian Intellectual Property Office; Written Opinion filed in corresponding International Application No. PCT/CA2023/051017, dated Sep. 11, 2023; 3 pages.

\* cited by examiner

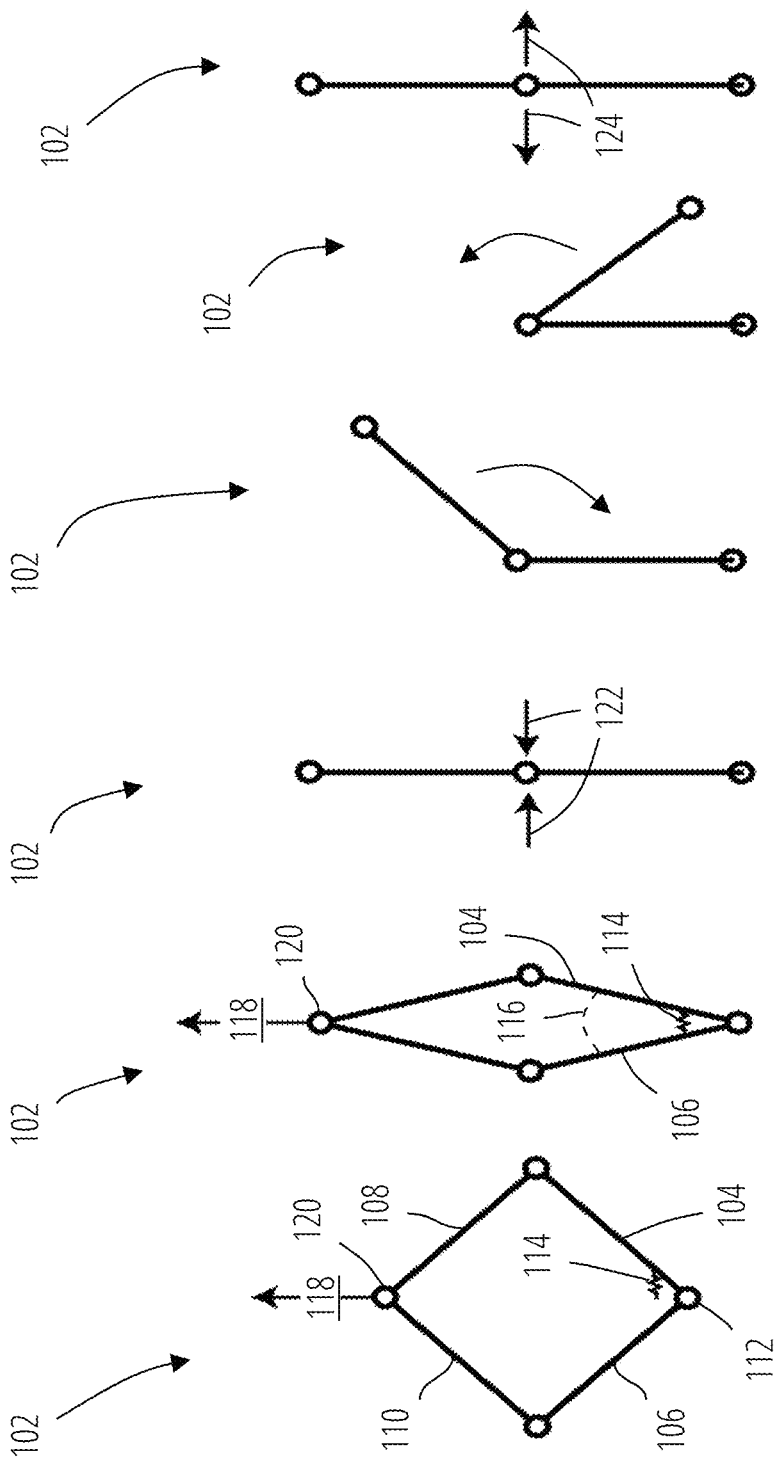

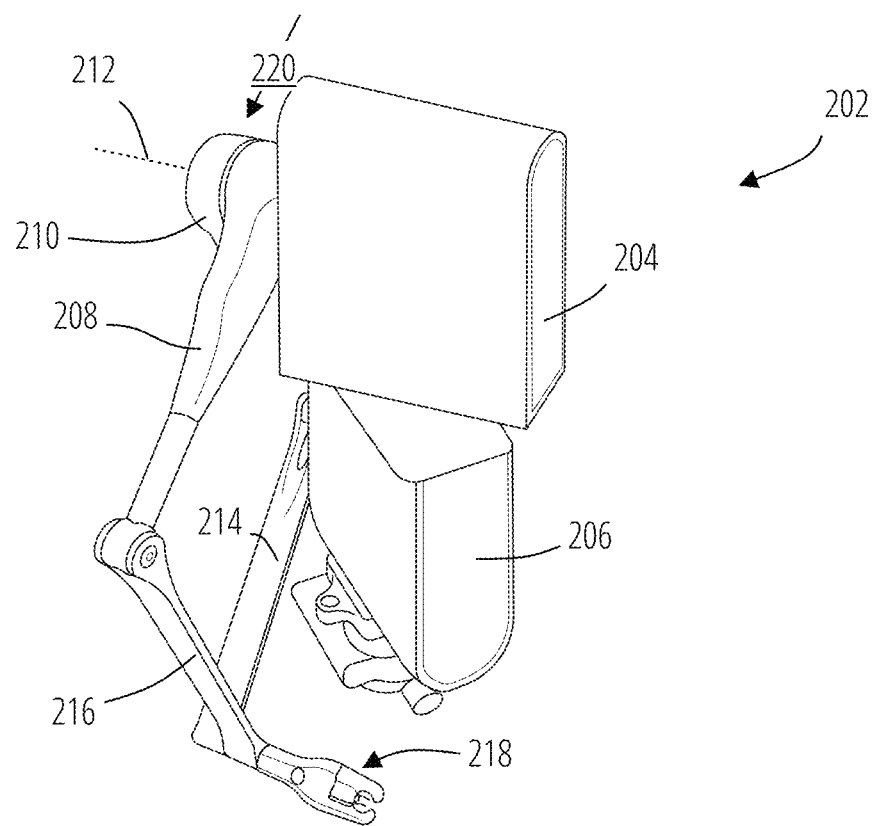
FIG. 2A
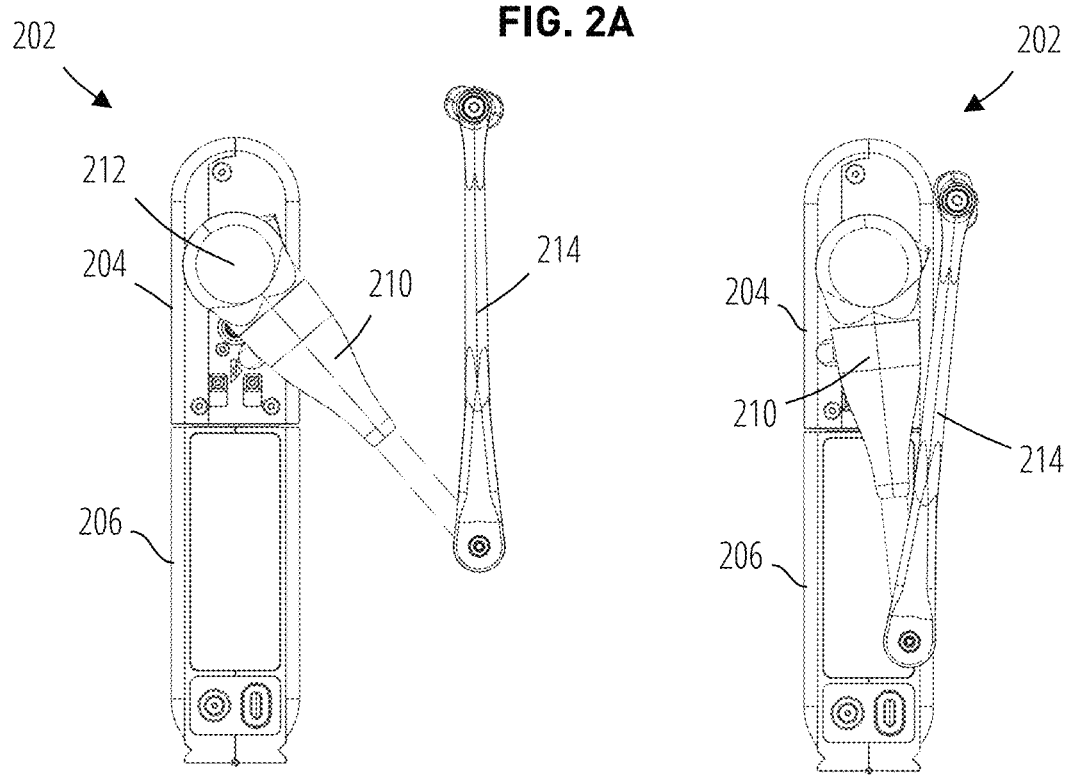
FIG. 2B  FIG. 2C

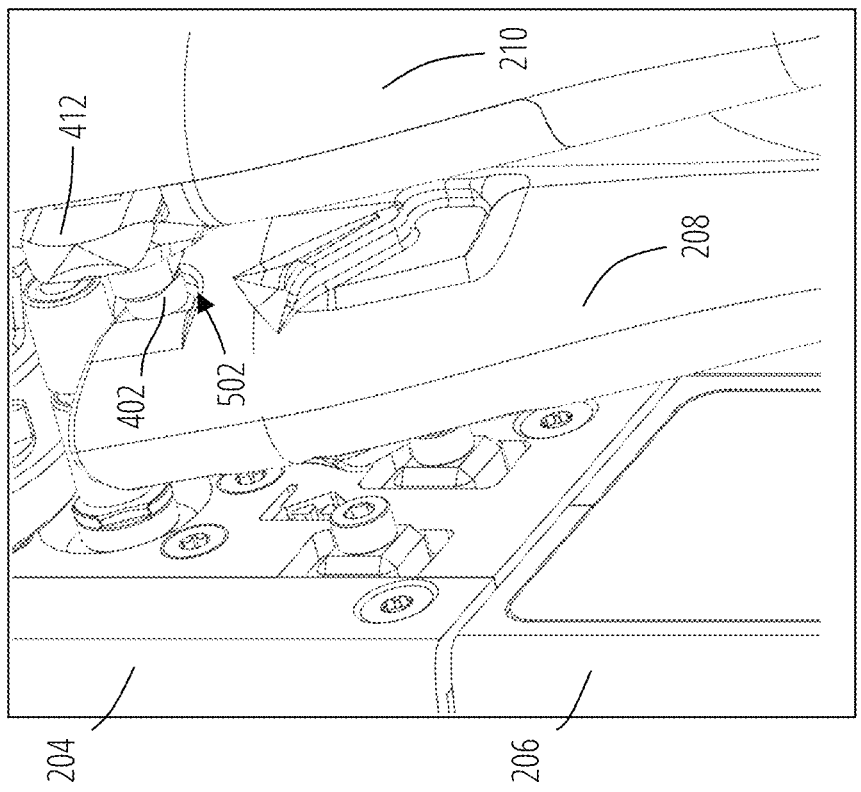
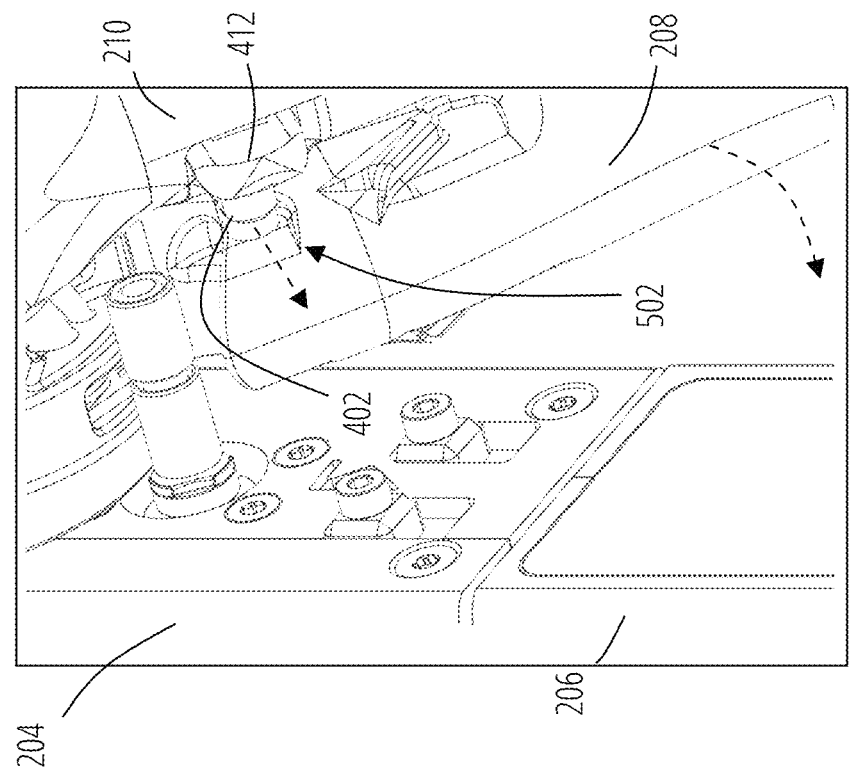

FIVE-BAR FOLDING MECHANISM AND METHOD WITH QUICK RELEASE FUNCTIONALITY

CROSS-REFERENCE TO RELATED APPLICATIONS

This application claims the benefit of U.S. Provisional Application No. 63/392,945 filed Jul. 28, 2022, which is incorporated herein by reference in its entirety.

FIELD OF THE DISCLOSURE

The present disclosure relates to haptic devices, and, in particular, to a five-bar folding mechanism with quick release functionality.

BACKGROUND

A five-bar mechanism is a two degree of freedom (2-DOF) planar mechanism that is commonly used in different fields ranging from prosthetics, robotics and haptic feedback. The mechanism typically consists of five bars: the ground link, which does not move and can have a length of zero; two actuated links; two passive links, each connected to an actuated link on one end, and to the other passive link on the other, forming a closed loop. End stops typically used to limit the motion of the passive links to avoid singularities, or configurations where the motion of the mechanism may be undesirable.

International Pat. App. Pub. Numb. WO 2022/053873 proposed a releasable end-stop that allowed one of the actuated links to pass though singularity, allowing the mechanism to fold onto itself. The proposed solution required the user to manually release the end-stop when folding the arms and manually return the actuated link of the device to the correct location when unfolding the arms.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

The present disclosure provides, in accordance with different embodiments, different examples of a five-bar folding mechanism that allows to easily and rapidly unfold the five-bar arms or links with minimal input from the user. Advantageously, the proposed solution includes an energy storing element that stores the mechanical energy provided by the user when the arms of the five-bar mechanism are folded and releases the energy during the unfolding operation. The proposed invention improves the arm folding capabilities of a five-bar mechanism by using an energy storage component between the two links. Adding the component limits the workspace of the device without using hard end-stops and helps a user fold and unfold the mechanism arms.

In accordance with one aspect, there is provided a five-bar folding mechanism for use with a five-bar linkage comprising a first arm and a second arm rotatively coupled to a same joint, the first arm and second arm defining an angle therebetween, the mechanism comprising: an energy storage element coupled to the first arm and configured to be engaged by the second arm upon the angle being smaller than a designated angle, and to store mechanical energy upon said first arm and said second arm being brought further into co-alignment; wherein the energy storage element is further configured to release the stored mechanical energy upon the five-bar linkage being unfolded.

In one embodiment, the first arm and the second arm are active links.

In one embodiment, the first arm and the second arm are passive links.

In one embodiment, the energy storage element comprises a spring.

In one embodiment, the energy storage element is a torsion spring pin protruding outwardly from the first arm.

In one embodiment, the energy storage element comprises an elongated member coupled to the spring, the elongated member protruding outwardly laterally from the first arm and mounted in a linear channel oriented transversely with respect to the length of the first arm.

In accordance with another aspect, there is provided a five-bar folding method for use with a five-bar linkage comprising two active links and two passive links, the two active links being rotatably coupled at a first end thereof to a same joint and coupled at a second end thereof to one of the two passive links, the two passive links being coupled together at an end effector, comprising the steps of: pulling, by a user, on the end effector to initiate folding of the five-bar linkage in an initial opened configuration, thereby reducing an angle defined between the two active links of said five-bar linkage; upon the angle being smaller than a designated angle, an energy storage element coupled to a first link of said two active links engaging the other active link; pushing, by a user, simultaneously on two joints coupling an active link to a passive link to further decrease said angle and further engage the other active link against the energy storage element to store mechanical energy therein; upon said two active links and said two passive links being in co-alignment, folding by the user the two passive links with respect to the two active links.

In one embodiment, the method further comprises the steps of: unfolding, by the user, the two passive links with respect to the two active links so as to have them all in co-alignment; releasing, by the energy storage element, the stored mechanical energy and pushing the two active links apart to restore the open configuration.

In one embodiment, the energy storage element comprises a spring.

In one embodiment, the energy storage element is a torsion spring pin protruding outwardly laterally from said first link.

In one embodiment, the energy storage element further comprises: an elongated member coupled to the spring, the elongated member protruding outwardly laterally from the first link and mounted in a linear channel oriented transversely with respect to the length of the first arm.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein:

FIGS. 1A to 1F are schematic diagrams illustrating a five-bar mechanism, in accordance with one embodiment;

FIGS. 2A, 2B and 2C are a perspective view (2A) and side views (2B and 2C) of a haptic force feedback device comprising a five-bar linkage, in accordance with one embodiment;

FIG. 5A and FIG. 5B are perspective views illustrating the five-bar mechanism of FIGS. 4A and 4B in action, in accordance with one embodiment.

Figure 3D:
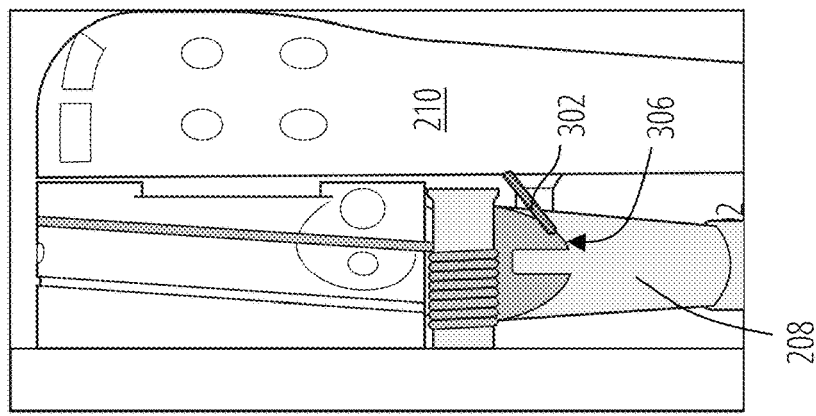
FIGS. 3A to 3D are side views of a five-bar energy storage mechanism with the device of FIGS. 2A-2C, in accordance with a first embodiment.
Figure 3C:
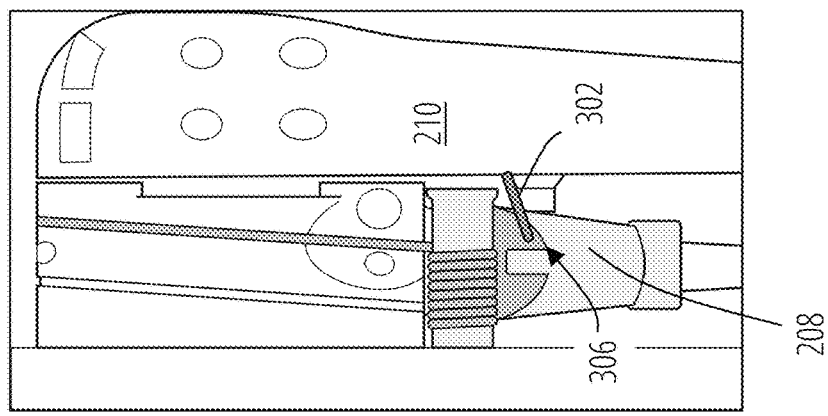
Figure 3B:
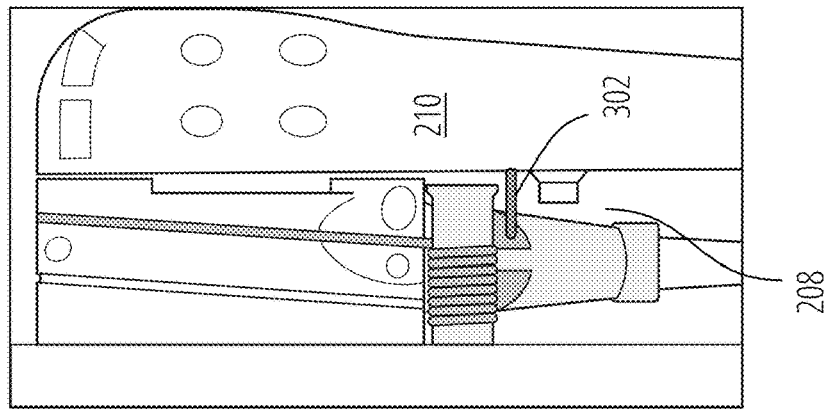

Elements in the several drawings are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

FIGS. 1A to 1F show a five-bar mechanism at different stages of folding. The five-bar structure 102 illustrated includes, as an example only, two actuated arms/links 104 and 106 coupled to two passive arms/links 108 and 110, respectively. The arms 108 and 110 are in turn also coupled to one another. This example has a zero-length ground link (e.g., arms 104 and 106 are rotatably coupled at a same joint 112).

In this example, the energy storing element of the five-bar structure takes the form of a linear spring 114 affixed at one end to the arm 104, and being oriented and having a length such that the spring 114 engages the other arm 106 only when the angle 116 between the actuated arms 104 and 106 becomes small enough, i.e. near a singularity. As the angle between the actuated arms further decreases, the spring 104 is compressed storing mechanical energy in the process. Upon the arms approaching the singularity, the component of the force compressing the spring 114 approaches zero, making it impossible to reach the singularity by applying a force to the end-effector, constraining the motion without the need for end-stops.

In FIG. 1A, the spring 114 is not engaged and all the links 104, 106, 108 and 110 are free to move. FIG. 1B shows the mechanism near the singularity (e.g., when the links or arms are co-aligned) where the spring 114 begins to engage link 106. As the two links 104 and 106 become more parallel, the force 118 required to bring them closer to each other by pulling on the end effector 120 approaches infinity, which means that the force must be provided by the user, represented by two arrows 122. Once in the singularity (e.g., the links being co-aligned in FIG. 1C), the passive links 108 and 110 move freely and require no force to keep the mechanism folded. By bending the passive links relative to the active links (FIG. 1D), the spring can no longer release energy and the passive links can be moved freely (FIG. 1E). The arms or links can unfold only when the mechanism is brought near singularity again (FIG. 1F) at which point the force 124 of the springs releases the stored energy and pushes the links apart (forces 124) into the correct configuration (e.g. FIG. 1A).

While above the energy storage element or device is shown located in proximity to the joint linking the two actuated links 104 and 106, more generally the energy storage element or device may be located between any two connected links or arms, without limitation. In addition, the above discussed mechanism is illustrated in a five-bar mechanism having a ground link of length zero, but the same mechanism or energy storage element may readily be used with other devices or structures with other lengths of the ground link and in non-symmetric configurations as well.

Other means or mechanisms for storing and releasing energy other than mechanical energy may also be used instead of a spring, for example a pair of magnets having opposite polarities (one on each joined link or arm).

FIGS. 2A to 2C show an exemplary haptic device 202 comprising a five-bar linkage, in accordance with one embodiment. The device 202 comprises a base having an upper portion 204 rotatably coupled to a lower portion 206. The lower portion 206 is configured to be removably affixed or grounded to a surface or the like. The five-bar linkage comprises two active/actuated links/arms 208 and 210 joined along a same joint axis 212. The actuated link 208 is located proximate to the upper portion 204, while the link 210 is outwardly adjacent to the link 208. The links 208 and 210 are configured so that their facing sides are in close proximity upon the links being co-aligned. The five-bar linkage further comprises passive links 214 and 216. Links 214 and 216 are rotatably coupled at one end to the actuated links 210 and 208, respectively, and rotatably coupled to one another at their other end, forming a close loop. Also shown is a receiver assembly 218 extending laterally from the common joint linking both passive arms 216 and 214 for attaching a tool or the like. The device 202 is typically configured to provide haptic force feedback by actuating the linkage in response to a displacement of the receiver assembly by a user interacting with a virtual reality or simulated 3D environment. FIG. 2B and FIG. 2C show the device 202 with the links being partially and completely folded, respectively.

FIGS. 3A to 3D show a side view of the actuated links 210 and 208 (e.g., in the direction of arrow 220 in FIG. 2A). Shown, in accordance with one embodiment, is an energy storage element in the form of a torsion spring pin 302 protruding perpendicularly outwardly from the surface 304 of link 210 (e.g., the one facing the other link 208). The pin 302 is configured so as to be engageable of a side thereof by the link 208 upon the links 208 and 210 being rotated relative to one another and an angle defined by the links 208 and 210 being smaller than a designated value.

Figure 3A:
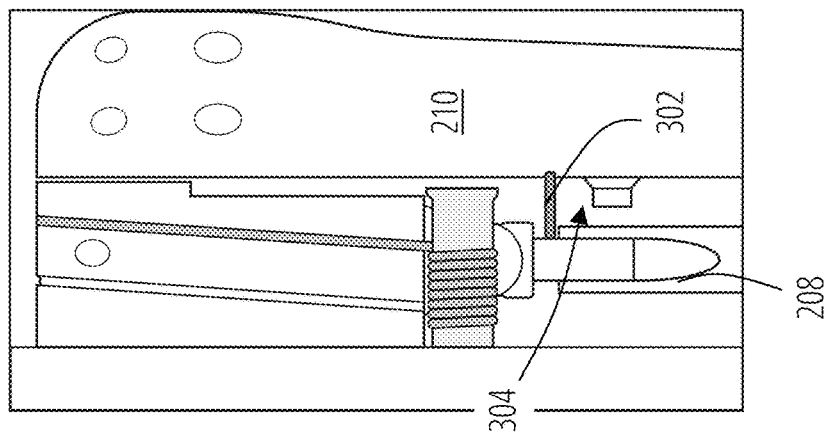

FIG. 3A to 3D shows this exemplary embodiment in different stages of folding. In FIG. 3A, the spring pin 302 is not engaged and the mechanism is free to move. The spring pin 302 engages the arm or link 208 (in this example via a recess 306 configured to engage the link 208 laterally) in FIG. 3B and compresses further in FIG. 3C. The arms 208 and 210 are in co-alignment/parallel and the pin spring 302 is fully compressed in FIG. 3D. The arms 208 and 210 can unfold only when the passive and active links approaches the singularity, at which point the spring ping 302 can release the stored energy and push the active links 208 and 210 in the correct configuration (e.g., away from each other in the correct direction), unless acted upon by an outside force.

Figure 4A:
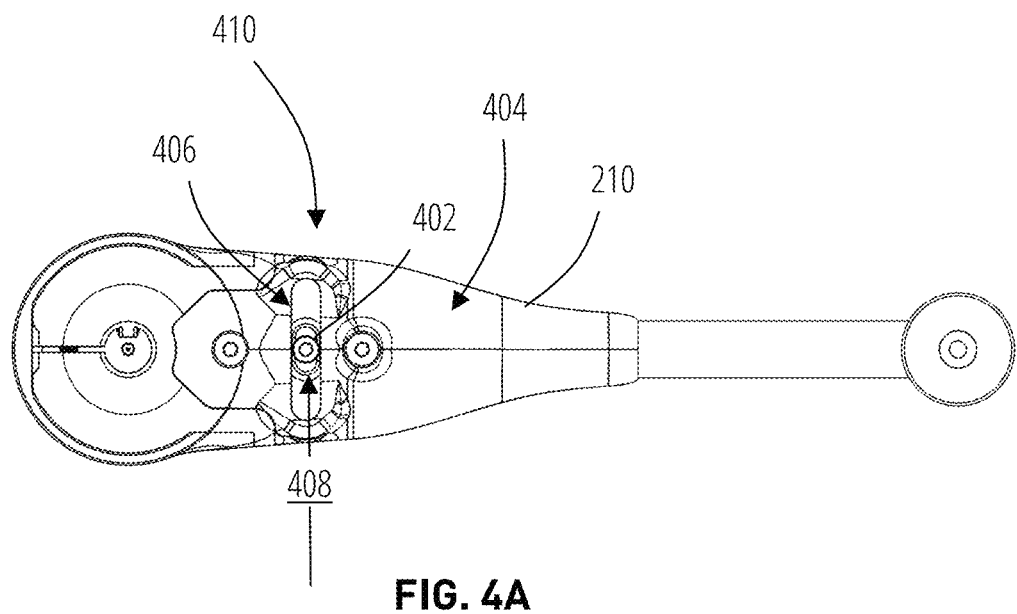
FIG. 4A and FIG. 4B are side views of a link of a five-bar haptic force feedback device comprising a five-bar mechanism, in accordance with a second embodiment.
Figure 4B:
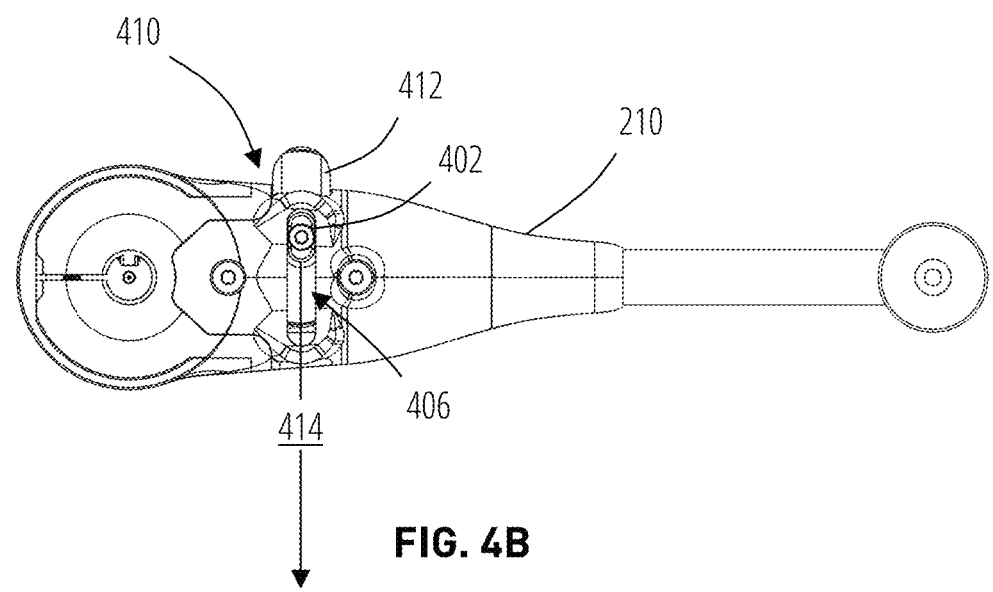

FIG. 4A and FIG. 4B show a second embodiment of the energy storage element. In this embodiment, the energy storage element takes the form of a protruding elongated member 402 coupled to a linear spring. The member 402 extends outwardly and perpendicularly from the surface 404 of the arm 210 (e.g., the one facing the other active link/arm 208 when they are parallel to one another), and is engaged in a linear channel 406 extending transversely along the arm's width. The member is coupled to a linear spring (not shown) which allows the member 402 to be moved (for example upon being engaged by the other actuated/active link) as shown by the arrow 408 in FIG. 4A along the channel 406 towards the lateral side 410 of the arm 210, compressing the spring installed within. The mechanism further includes a tab portion 412 configured to extend laterally outwardly from a slit along the lateral slide 410 upon the spring being fully compressed, as shown in FIG. 4B. The arrow 414 shows the direction of the spring force which is configured to push back the member 414 to its original position.

FIG. 5A and FIG. 5B show the mechanism of FIG. 4A and FIG. 4B in action, in accordance with one embodiment. FIG. 5A shows the arms 210 and 208 being rotated relative to one another to be more parallel to each other, and upon an angle between the arms 210 and 208 being small enough, a recess 502 in arm 208 engaging the member 402 laterally, thereby pushing the member 402 along the channel 406, compressing the spring, and pushing outwards the tab portion 412. FIG. 4B shows the member 402 fully extended and the arms 210 and 208 in co-alignment with the spring fully compressed. As noted above, upon the passive arms being parallel (e.g., in the singularity), the forces are such that the spring cannot release the stored mechanical energy and extend the member 402 to push the arms apart. This allows the device to be fully folded for storage (as shown in FIG. 2C for example). Upon the arms being unfolded and rotated back into the singularity, the spring releases the stored mechanical energy causing the member 402 to push on the arm 208, therefore pushing the arms apart in the correct opened configuration.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Information as herein shown and described in detail is fully capable of attaining the above-described object of the present disclosure, the presently preferred embodiment of the present disclosure, and is, thus, representative of the subject matter which is broadly contemplated by the present disclosure.

What is claimed is:

1. A five-bar folding mechanism for use with a five-bar linkage comprising a first arm and a second arm rotatively coupled to a same joint, the first arm and second arm defining an angle therebetween, the mechanism comprising:
    an energy storage element comprising a spring affixed to the first arm and spaced from the second arm upon when the angle is larger than a designated angle, and to contact the second arm and to store mechanical energy when said first arm and said second arm brought further into co-alignment and the angle is smaller than the designated angle
    wherein the energy storage element is further configured to release the stored mechanical energy upon the five-bar linkage being unfolded.

2. The five-bar folding mechanism of claim 1, wherein said first arm and said second arm are active links.

3. The five-bar folding mechanism of claim 1, wherein said first arm and said second arm are passive links.

4. A five-bar folding mechanism for use with a five-bar linkage comprising a first arm and a second arm rotatively coupled to a same joint, the first arm and second arm defining an angle therebetween, the mechanism comprising:
    an energy storage element coupled to the first arm and configured to be engaged by the second arm upon the angle being smaller than a designated angle, and to store mechanical energy upon said first arm and said second arm being brought further into co-alignment;
    wherein the energy storage element is further configured to release the stored mechanical energy upon the five-bar linkage being unfolded;
    wherein said energy storage element comprises a spring; and
    wherein the energy storage element is a torsion spring pin protruding outwardly from the first arm.

5. A five-bar folding mechanism for use with a five-bar linkage comprising a first arm and a second arm rotatively coupled to a same joint, the first arm and second arm defining an angle therebetween, the mechanism comprising:

an energy storage element coupled to the first arm and configured to be engaged by the second arm upon the angle being smaller than a designated angle, and to store mechanical energy upon said first arm and said second arm being brought further into co-alignment;

wherein the energy storage element is further configured to release the stored mechanical energy upon the five-bar linkage being unfolded;

wherein said energy storage element comprises a spring; and wherein said energy storage element comprises:

an elongated member coupled to the spring, the elongated member protruding outwardly laterally from the first arm and mounted in a linear channel oriented transversely with respect to the length of the first arm.

6. A five-bar folding method for use with a five-bar linkage comprising two active links and two passive links, the two active links being rotatably coupled at a first end thereof to a same joint and coupled at a second end thereof to one of the two passive links, the two passive links being coupled together at an end effector, comprising the steps of:

pulling, by a user, on the end effector to initiate folding of the five-bar linkage in an initial opened configuration, thereby reducing an angle defined between the two active links of said five-bar linkage;

upon the angle being smaller than a designated angle, an energy storage element coupled to a first link of said two active links engaging the other active link;

pushing, by a user, simultaneously on two joints coupling an active link to a passive link to further decrease said angle and further engage the other active link against the energy storage element to store mechanical energy therein;

upon said two active links and said two passive links being in co-alignment, folding by the user the two passive links with respect to the two active links.

7. The five-bar folding method of claim 6, further comprising the steps of:

unfolding, by the user, the two passive links with respect to the two active links so as to have them all in co-alignment;

releasing, by the energy storage element, the stored mechanical energy and pushing the two active links apart to restore the open configuration.

8. The five-bar folding method of claim 6, wherein said energy storage element comprises a spring.

9. The five-bar folding method of claim 6, wherein the energy storage element is a torsion spring pin protruding outwardly laterally from said first link.

10. The five-bar folding method of claim 8, wherein said energy storage element further comprises:

an elongated member coupled to the spring, the elongated member protruding outwardly laterally from the first link and mounted in a linear channel oriented transversely with respect to the length of the first arm.

* * * * *